United States Patent [19]
Labedz

[11] Patent Number: 4,797,947
[45] Date of Patent: Jan. 10, 1989

[54] MICROCELLULAR COMMUNICATIONS SYSTEM USING MACRODIVERSITY

[75] Inventor: Gerald P. Labedz, Chicago, Ill.

[73] Assignee: Motorola, Inc., Schaumburg, Ill.

[21] Appl. No.: 44,920

[22] Filed: May 1, 1987

[51] Int. Cl.[4] .................... H04M 11/00; H04Q 7/00
[52] U.S. Cl. ........................................ 455/33; 455/69; 455/56; 379/62; 379/60
[58] Field of Search ............... 455/33, 56, 69; 379/59, 379/60, 62; 370/95

[56] References Cited

U.S. PATENT DOCUMENTS

| | | |
|---|---|---|
| 3,819,872 | 6/1974 | Hamrick . |
| 3,848,093 | 11/1974 | Edstrom . |
| 3,898,390 | 8/1975 | Wells et al. . |
| 3,906,166 | 9/1975 | Cooper et al. . |
| 4,398,291 | 8/1983 | Hotta et al. . |
| 4,414,661 | 11/1983 | Karlstrom ............................ 455/33 |
| 4,470,141 | 9/1984 | Takada . |
| 4,574,163 | 3/1986 | Zato . |
| 4,578,815 | 3/1986 | Persinotti ............................ 455/17 |
| 4,613,990 | 9/1986 | Halpern ............................... 455/69 |
| 4,638,479 | 1/1987 | Alexis .................................. 370/95 |

FOREIGN PATENT DOCUMENTS 1195016 10/1985 Canada .

OTHER PUBLICATIONS

Uddenfeldt et al.; "A Digital FD/TDMA System for a New Generation Cellular Radio"; Proceedings, 2nd Nordic Seminar on Digital Land Mobile Radio Communications; Oct. 14–16, 1986, pp. 99–104.

Imamura et al.; "Mobile Communication Control Using Multi-Transmitter Simul/Sequential Casting (MSSC)"; IEEE Trans. Veh. Tech.; May 1986; pp. 334–341.

Kammerlander: "Cellular Technology Drives On"; Telephony, Aug. 26, 1985; pp. 34–40.

Swerup et al.; "Digital Cellular"; Personal Communications Technology; May, 1986; pp. 6 to 12.

Primary Examiner—Jin F. Ng
Assistant Examiner—David H. Kim
Attorney, Agent, or Firm—Raymond A. Jenski; Rolland R. Hackbart

[57] ABSTRACT

A cellular system employing time division messages transmitted from a plurality of radiators in each cell is disclosed. A first electromagnetic signal at a particular frequency is transmitted during one time slot from one of the plurality of radiators. A second electromagnetic signal at the same frequency is transmitted during another time slot from a second one of the plurality of radiators. A remote unit selects the best electromagnetic signal and communicates the selection to a cell controller, which selects a third time slot for transmission of a message from the radiator transmitting the best electromagnetic signal.

39 Claims, 9 Drawing Sheets

MICROCELLULAR COMMUNICATIONS SYSTEM USING MACRODIVERSITY

BACKGROUND OF THE INVENTION

This invention relates generally to high density radio communications systems and more particularly to cellular radiotelephone systems employing digital communications techniques to increase the number of channels available in a fixed radio frequency bandwidth and geographic area.

Radio communications systems which employ controlled transmission and reception parameters to realize a plurality of non-interfering defined coverage areas are well known in the art as cellular radiotelephone systems. Variations in design, direction of radio signal illumination, and techniques of system growth have been the subject of several U.S. Pat. Nos.: 3,663,762—Joel, Jr.—"Mobile Communication System"; 3,819,872—Hamrick—"Mobile Telephone Cellular Switching System"; 3,906,166—Cooper et al.—"Radio Telephone System"; 4,128,740—Graziano—"Antenna Array for a Cellular RF Communications System"; and 4,144,411—Frenkiel—"Cellular Radiotelephone System Structured for Flexible Use of Different Cell Sizes". Cellular systems may further be characterized as being capable of automatically and unobtrusively maintaining radio communications between fixed stations and remote stations as the remote stations move across the borders of the cells.

Some of these traditional systems anticipate an increasing number of users with passing time and have developed graceful methods of subdividing and shrinking cell areas to enable multiple reuse of radio frequencies in a fixed geographic area. Generally, each system grows by making the cells smaller and maintaining the pattern of frequency allocation to each of the cells. There are, however, at least two factors which place a limit on the minimum size to which a cell can be shrunk. These factors are the rate at which remote stations move through the cells, and the non-uniformity of the electromagnetic field in the cell. Both factors relate to the time required to determine the relative location of the remote station and to process a handoff of the remote station from the fixed station of one cell to the fixed station of another cell, where the remote station is currently located.

Determination of the location of a remote station is typically performed by measuring the signal strength or quality of the radio signal as received at the fixed station. Because the electromagnetic field in non-uniform, the measurement of signal strength (or quality) is made a plurality of times or averaged over a period of time. The time required becomes longer as the turbulence of the electromagnetic field increases or as the necessary accuracy of the signal strength measurement increases. Thus, there is a finite amount of time which must be spent in determining the location of the remote station. When the density of remote stations becomes large, dedicated equipment is employed at the fixed stations full time in making signal measurements.

Once the measurement is made, a decision must be made whether a handoff of the remote station to another cell is required. If a handoff is required, one or more candidate cells must be queried for their idle channel status and for a verification of the remote station's signal strength in that candidate cell. Processing of the decision, status, and verification usually requires the intervention of higher level system control functions in addition to the control functions in the serving and candidate cells. Additionally, the remote station must be instructed to tune to a frequency available in the candidate cell and verification of its presence after the handoff must be made by the candidate cell. Thus, a significant amount of time is used for handoff processing.

Digital radio transmission techniques, such as would be used with point-to-point systems, have been considered for high capacity cellular systems but previously have not found practical application due to the cost and complexity of digital equipment required to mitigate the effects of intersymbol interference caused by the multiplicity of signal arrival times at the receivers in the system.

SUMMARY OF THE INVENTION

Therefore, it is one object of the present invention to provide means for implementing a very small cell (microcell) in a cellular system.

It is another object of the present invention to employ a digital burst technique to communicate information between a fixed station and a remote station in a cellular system.

It is another object of the present invention to enable the remote station to select the best of several radiators within a particular cell.

Accordingly, these and other objects are realized in the present invention which encompasses a radio system having a plurality of distinct electromagnetic radiation coverage areas, each of which are controlled by an area controller and which serves a plurality of remote stations within a coverage area. The system includes a radiator for transmitting a first electromagnetic signal which is separated into a plurality of time slots on a predetermined frequency into a first portion of a coverage area. The system also includes a radiator for transmitting a second electromagnetic signal, which is separated into a plurality of time slots on the same frequency, into a second portion of the coverage area. A remote station selects between the first and second electromagnetic signals and communicates the selection to the area controller. The area controller then selects a time slot in the electromagnetic signal selected by the remote station to transmit a portion of a message to the remote station.

DETAILED DESCRIPTION OF THE PREFERRED EMBODIMENT

Figure 1:
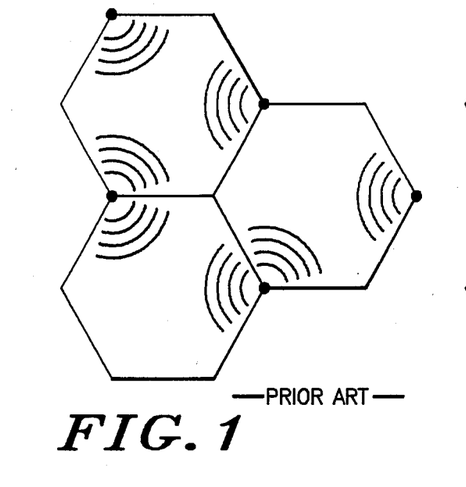
FIG. 1 is an illustration of a geographic area covered by a stylized hexagonal radio coverage area pattern with radio transmission and reception occurring from fixed stations located at the vertices of the hexagonal patterns, as is conventional for one type of the cellular radiotelephone system.
Figure 2:
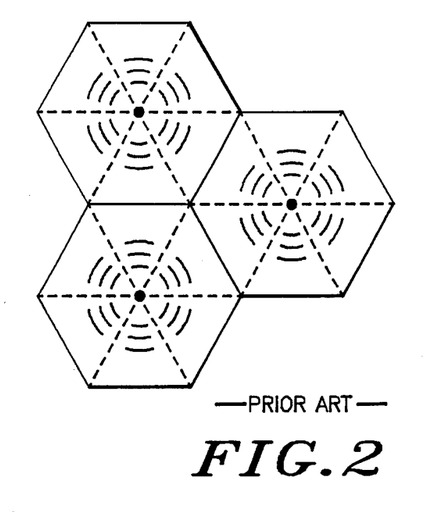
FIG. 2 is an illustration of a geographic area covered by a stylized hexagonal radio coverage area pattern with radio transmission and reception occurring from fixed stations located at the center of the hexagonal patterns and further subdividing the pattern into sectors, as is conventional for a second type of cellular radiotelephone system.

Generally cellular systems are conceptualized as a packing of hexagonal geographic areas, or cells, and having definite and sharp boundaries between the cells. Each cell can be illuminated with radio signals from the conceptual vertices of the hexagonal cells as shown in FIG. 1 or from the center outward, in segments, such as that shown in FIG. 2. These conceptual patterns enable a cellular system designer to study and plan cellular systems without the perturbations of problems encountered in field implementation of the systems. Non-uniform electromagnetic fields are encountered due to reflections and obstructions such as that diagramed in FIG. 3.

Figures 3, 4:
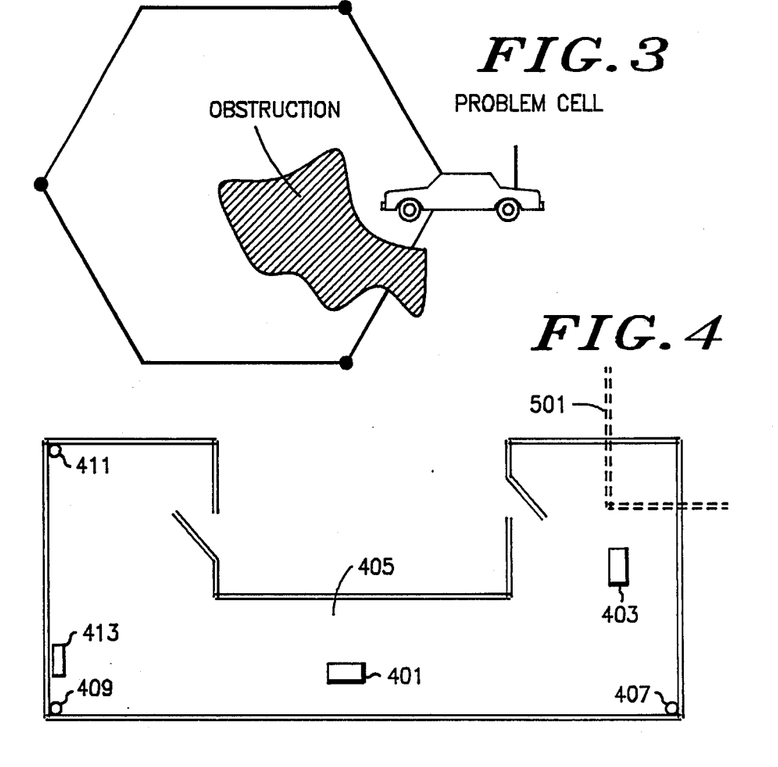
FIG. 3 is an illustration of a geographic area covered by a stylized hexagonal cell in which an obstruction to radio signals is shown.
FIG. 4 is an illustration of a small area having an irregular shape and several obstructions and which may be considered to be single cell.

In FIG. 3 a remote station may drive or be carried behind an obstruction such that radio signals to and from the remote station will be blocked or greatly attenuated. Known or discovered obstructions are typically cured by proper layout of the cellular pattern so that as the remote station moves into the attenuated area, it is handed off to another cell which can provide radio coverage into the shadow area.

As described earlier, when the cells become small the number of handoffs between one cell and another become large and the time required to process the handoff can become objectionable. It is conceivable that a cell's size may be shrunk to the dimensions of a city block or a single floor of an office building. In situations such as these, a hand-held remote station can be carried into locations where large and abrupt changes in signal strength can be realized in a matter of a few steps. A single cell, then can be conceptualized as a corridor with sharp corners and/or a series of rooms electromagnetically shielded from each other.

One of the virtually limitless conceptualizations is diagramed in FIG. 4. Here there are two remote stations 401 and 403 which can be moved or carried throughout the cell 405. A plurality of radiators of electromagnetic energy (407, 409, and 411), which may be radio transmitters and receivers or infrared transmitters and receivers, are placed at optimum locations within cell 405. Such non-colocation of radiators and sites of reception constitutes a macrodiversity system. A cell area controller 413 can be placed at a convenient location such that interconnection with radiators 407, 409 and 411 may be made.

Figure 5:
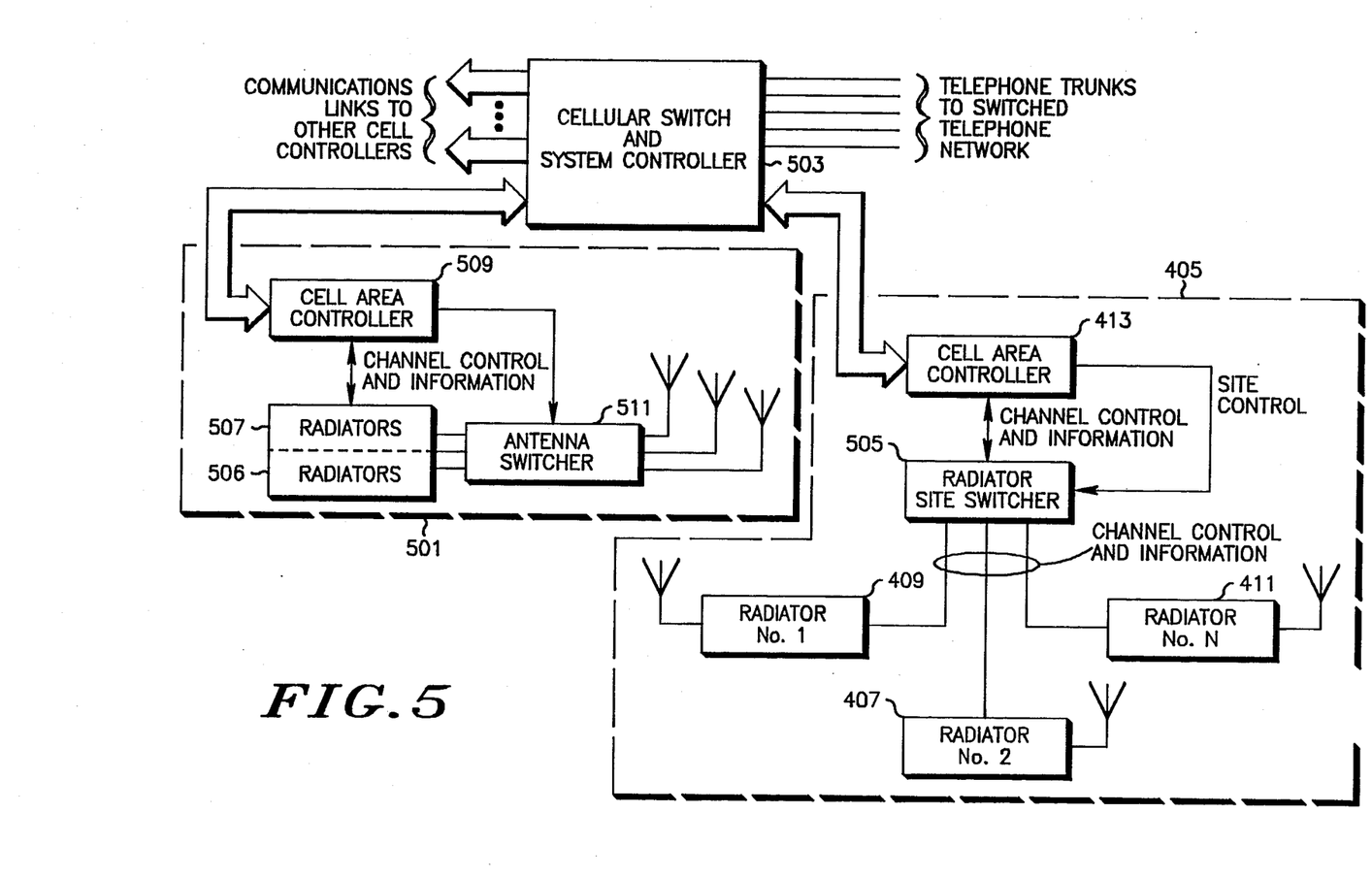
FIG. 5 is a block diagram showing the interconnection between the fixed equipment which may be employed in the present invention.

A block diagram illustrating the interconnection between the controller 413 and the radiators within cell 405 is shown in FIG. 5. Additionally, connections to other cells, such as cell 501, may be made from controller 413 via a cellular switch and system controller 503. Two configurations are illustrated: a cell site (405) employing radiators and antennas remote from the cell area controller 413 and utilizing a radiator site switcher 505 to convey channel and control information to the remote radiators (407, 409, and 411); and a cell site (501) employing radiators 506 and 507 colocated with the cell area controller 509 and utilizing remote antennas selected by an antenna switcher 511. Other configurations of hardware are possible and the present invention need not be limited to a particular cell hardware configuration. Such cellular switches and system controllers may employ conventional cellular radiotelephone hardware.

With a configuration such as that shown in FIG. 5, it is possible for a remote station to be handed off between cell 405 and cell 501 in a conventional fashion. If cells 405 and 501 are, for example, the fourth and fifth floor of an office building, the radiators 407, 409, and 411 would operate at one frequency of electromagnetic radiation and radiators 506 and 507 would operate at a second frequency of electromagnetic radiation. An area of electromagnetic energy overlap would be provided, for example in a stairwell, such that a conventional frequency change handoff between cell area controller 413 and cell area controller 509 and their associated radiators or radiator antennas can take place. The cellular switch and system controller 503 mediates the conventional handoffs between cells and further interconnects the messages received from the remote stations to telephone trunks coupled to the switched telephone network.

The operation of the system of the present invention can best be apprehended by again considering FIG. 4. The remote station 401 can obtain service from the electromagnetic radiations of radiator 409 or radiator 407. In conventional cellular systems, a decision as to which radiator would serve remote station 401 would be made by the area controller 413. This decision, of course, would entail the time consuming handoff process described previously. In the microcell of the present invention, remote station 401 decides which radiator is providing the best signal strength or the best signal quality. (Radio signal strength measurement is well-known in the art and can be measured by comparison of the amplitude of the electromagnetic signal from radiator 409 to the amplitude of the electromagnetic signal received from radiator 407. A signal quality measurement may be made by comparison of the signal level above received noise or by measurement of data bit error rate, as conventionally known). Methods and apparatus to realize signal strength measurements have been described in U.S. Pat. Nos. 4,549,311; 4,704,734; and 4,696,027. As the remote station 401 moves toward radiator 409, it will encounter a point at which transmissions from all three radiators in the present example can be received. Upon turning the corner toward radiator 411, remote station 401 will quickly lose the electromagnetic signal from radiator 407. This is, the signal strength will go from a perfectly usable signal to a totally unusable signal in a matter of a few steps. If this dramatic drop in received signal strength were to occur in a conventional cellular system, it is likely that the call would be lost completely. By providing the remote unit itself with the capability of measuring and deciding upon the best radiator, the remote station itself will quickly select the best radiator without the attendant delay of a conventional handoff. Furthermore, the remote station can be assured that its inbound signal, containing the information about the radiator of choice, will be heard by one of the radiators and communicated to the area controller. Thus, in the example of FIG. 4, remote station 401 would initially select radiator 407 using signal strength or signal quality measurements. Then as it moved toward radiator 409, it would select radiator 409 and subsequently select radiator 411 as the remote station 401 moved closer to radiator 411.

If the type of system selected for this microcell employed frequency division multiplex, the remote station would be forced to have at least two receivers. This is because the remote station must now operate on at least two radio frequency channels simultaneously in order to measure the quality of the various radiator signals: one being the frequency it is using for communications, one being the frequency it is testing. The alternative is to steal time from the communications frequency for the measurement of a candidate frequency, causing a loss of data at the output of the remote station at an unacceptably rapid rate. If the radiators operated at a single radio frequency channel for each connection to a remote station, that is, simulcast, the traditional problems of frequency stability and coverage area overlap signal cancellation would have to be solved for each radio channel in the cell. It is primarily for these reasons that the preferred embodiment of the present invention employs a form of burst digital modulation commonly known as time division multiple access (TDMA), where a single remote receiver may be used to perform a quality measurement on a number of radiators without loss of received information.

Figures 6, 7, 8:
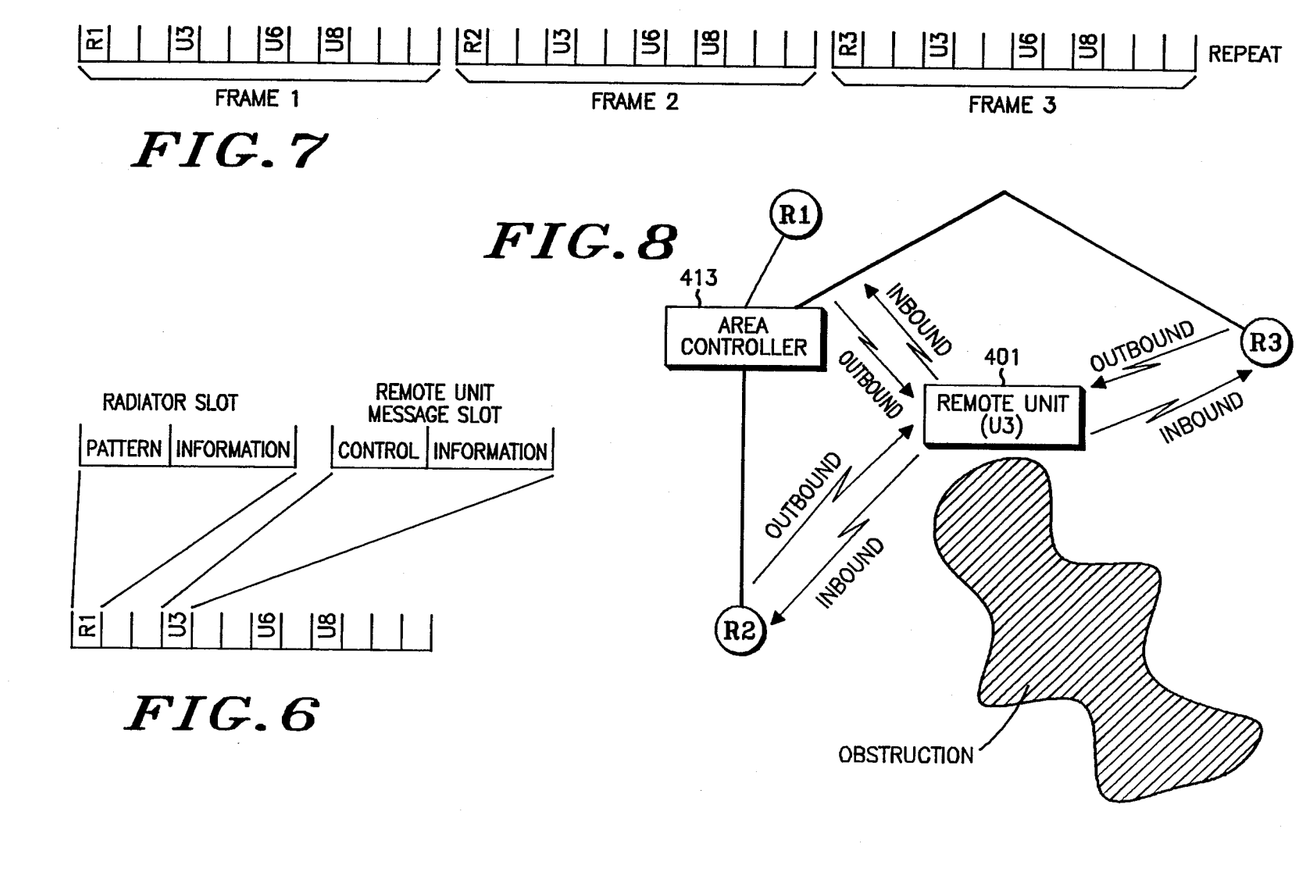
FIG. 6 is a timing diagram illustrating the time slots which may be employed in the present invention.
FIG. 7 is a timing diagram of a cycle of the time slots of FIG. 6.
FIG. 8 is a geographic illustration indicating the relationship between the fixed equipment and the remote unit as exists in the present invention.

TDMA is a well-known technique of sharing a limited channel resource among a large number of users. In the preferred embodiment, a radio channel or other segment of the electromagnetic spectrum having a bandwidth of approximately 250 KHz is divided into frames of time which, in turn, are divided into a plurality of slots. In the preferred embodiment there are 12 slots per frame as shown in FIG. 6. Each radiator is assigned a frame during which the radiator transmitter may transmit radiator slot information in one slot (R1) and transmit message information designated to a particular remote station in one of the remaining 11 slots (such as shown for U3). Furthermore, within each radiator slot (R1) there is a frame-defining pattern and a radiator identification sequence prior to information directed to the remote units. This information may be used to assign remote stations requesting service to a particular unused time slot so that a conversation or other message may be communicated. Within the remote station message slot there is found control and identification bits preceding the message information bits which contain the message to the remote unit.

Referring now to FIG. 7, the transmissions on a single electromagnetic frequency from 3 radiators are shown. Starting in time at the beginning of frame 1, the transmitter of radiator 1 turns on and transmits radiator slot information in the first time slot (R1) as shown. At the end of the first time slot, radiator 1 turns off thereby allowing any of the three radiators to transmit in the second time slot. In this example, there are no transmissions in the second or third time slot; the first transmission to a remote unit is in the fourth time slot (to remote unit U3). This transmission may be made by a selected radiator, for example radiator 2, which turns on, transmits the remote station message to remote unit U3, and turns off. Two unoccupied time slots follow, in this example, before time slot 7 (which is assigned to remote unit U6) during which a selected radiator, radiator 1, turns on, transmits to remote unit U6, and turns off. Likewise, an unoccupied time slot precedes the slot assigned to U8 which is served by a selected radiator, eg. Radiator 1.

Frame 2, in this example, begins with a transmission of radiator slot information by radiator 2 (R2) followed by transmissions to remote units U3, U6, U8 in the same relative time slots and from the same selected radiators as in frame 1. Frame 3 contains the radiator slot transmission from radiator 3 and transmissions to the remote units in the same relative time slots and from the same radiators as in frames 1 and 2. The frames then repeat. The position of the radiator slot information may be selected to be in any of the time slots and the control time slot may be of a different length than the other time slots. Furthermore, the total number of radiators need not be limited to the three used in this example.

The foregoing discussion applies to the transmissions from the fixed radiators—an outbound channel. In order that duplex operation be realized, a second—inbound—channel enabling remote units to transmit to the fixed equipment is required. Thus, the remote units transmit to the receivers of the radiators on a different electromagnetic channel as part of the inbound conversation. Alternatively, outbound and inbound converstions may share the same frequency by alternating between inbound and outbound conversations in time. Either way, the user equipment transmits its message to the radiator receiver in the time slot to which it has been assigned. A remote unit not presently having service but desiring service may request assignment via the inbound radiator slot of a frame.

Referring to FIG. 8, the generalized orientation of the remote unit U3 and the three radiators is shown. Assuming that the remote unit U3 has selected the electromagnetic signal from radiator 2, R2, and that the macrocell area controller 413 has designated the third slot of the frames as the slot to carry the message to and from the remote unit U3, the outbound channel from radiator R1 carries first its radiator slot data. Each radiator follows with transmissions in the time slots designated for their transmission to a remote unit followed by transmissions of frames 2 and 3.

At a time delayed from the commencement of the outbound channel transmissions (when duplexer hardware is to be avoided), the inbound transmission of the remote unit U3 occurs in its assigned time slot. If we now assume that remote unit U3 determines that the signal strength from radiator 1 (R1) is better than that from radiator 2 (R2) due perhaps to shadowing of the outbound channel by an obstruction, the user equipment will inform the area controller 413 (during the control section of the inbound remote unit U3 message slot) that it, U3, wishes the next outbound transmission of the remote unit message slot of information to come from radiator 1 (R1). The area controller 413 then reassigns the time slot transmission assignment to radiator 1 (R1) and informs radiator 2 (R2) that R2 no longer should transmit in the time slot to U3. Thus, handoff of the message communication within a cell requires only that the area controller 413 and the remote unit make the transfer decision thereby reducing the amount of time and fixed measuring equipment required for intra-cell handoff.

Figure 9:
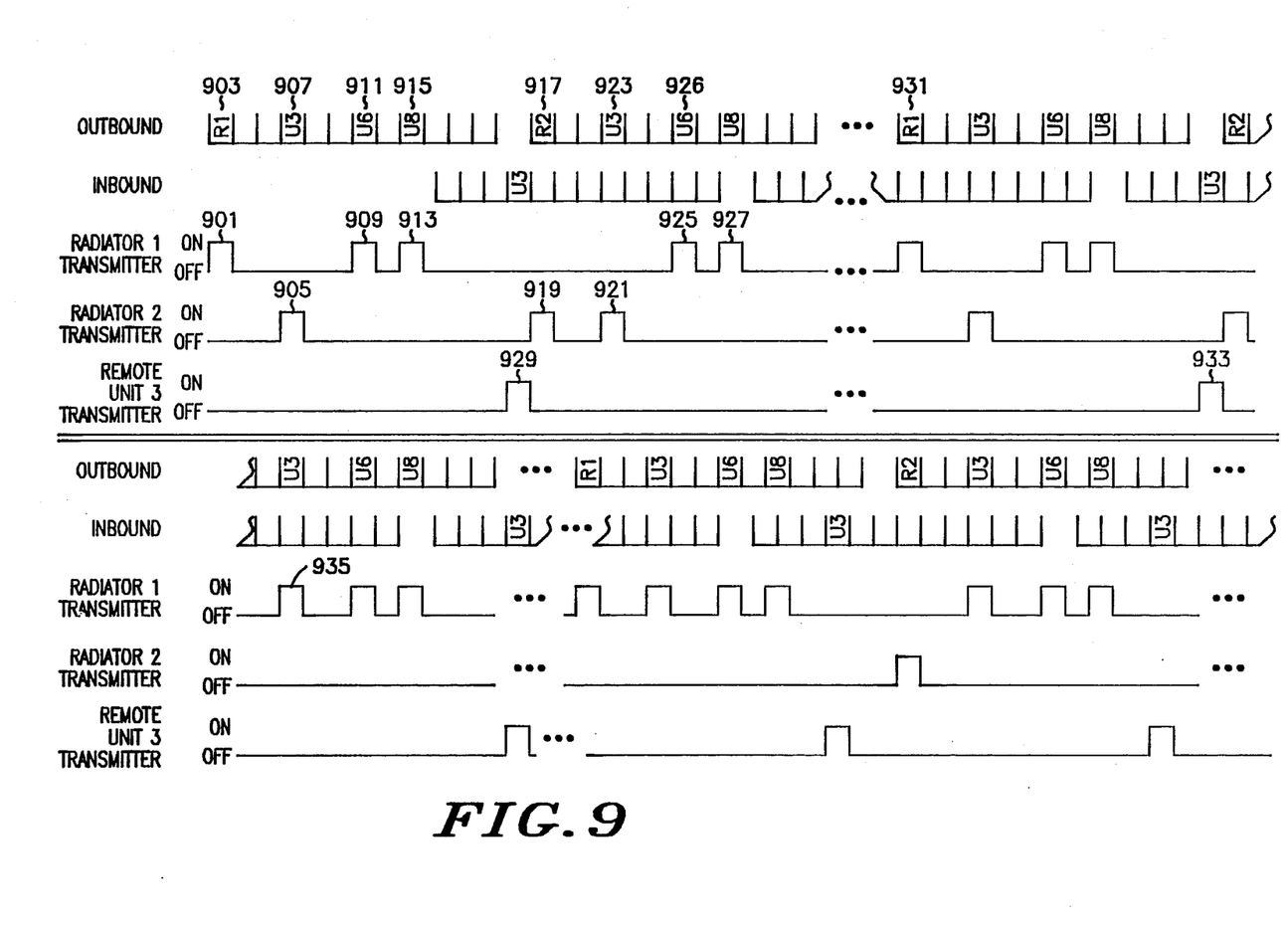
FIG. 9 is a timing diagram relating the activities of fixed radiators and a remote unit over several cycles of data time slot transmission which might occur in the present invention.

This transfer of message handling is diagramed in the outbound/inbound traffic diagram of FIG. 9. FIG. 9 shows the relative timing of the outbound and inbound frames, the on/off status of the transmitters of radiators 1 and 2, and the on/off status of the transmitter of remote unit U3. The diagram of FIG. 9 starts with the transmitter of radiator 1 being on, at 901, and transmitting the radiator R1 slot information of outbound frame 1 at 903. The first outbound frame contains the following messages as shown: the control slot R1, outbound message for remote unit (U3), outbound message for remote unit U6, outbound message for remote unit U8, and unoccupied time slots.

At the conclusion of the radiator R1 slot information 903, the transmitter of radiator R1 turns off. Radiator R2 turns on at the beginning of the third time slot, at 905, and transmits the remote unit message for U3, at 907. Radiator R2 transmitter is then turned off thereby allowing the other radiators to transmit in the designated time slots. This example considers only the activities of radiators R1 and R2 and the actions of other radiators are ignored here. The transmitter of R1 is turned on at 909 to transmit the outbound message to U6 (at 911), turns off for the next time slot, and turns on, at 913, to transmit the outbound message to U8, at 915. The transmitter of radiator R2 turns on for the transmission of the radiator slot information (917) of the second frame at 919. The transmitter of R2 again turns on at 921 to transmit the message to U3, at 923, and subsequently turns off to await the next time slot in which it is to transmit. The transmitter of R1 turns on at 925 to transmit the message to U6 at 926 and again turns on to transmit the message to U8 at 927. This sequence of events continues for each frame until a change is needed in the communication to the remote units.

Communication from remote unit U3 on the inbound channel is also shown in FIG. 9 relative to the outbound channel. The messages from the remote units are delayed by a small amount of time when duplex hardware is to be avoided. As shown, the transmitter of remote unit U3 turns on at the selected time to transmit in the remote unit message time slot, at 929. At the conclusion of the time slot, the U3 transmitter is turned off and remains off until the proper time slot in the next frame.

Each remote unit monitors the radiator slot in order to receive any system message information and, more importantly, to determine which radiator is providing the strongest signal (or the signal with the best quality) during the relatively brief time during transmission. Measurement during this short time enables the system of the present invention to reduce the effects of log normal, or shadow fading. If the remote station is moving quite slowly, the effects of Rayleigh fading will be corrected as well. If a better signal is received from a radiator which is not presently providing message transmission to the remote unit, a decision can be made (based on one or more radiator time slot measurements) to request handoff of outbound and inbound channel communications to the better radiator. Referring again to FIG. 9, remote unit U3 determines that radiator R1 is providing a better signal following reception of radiator slot information 931. In the next following transmission made by the remote unit U3 on the inbound channel, 933, the remote unit U3 requests that the area controller 413 reassign the transmission of the outbound channel message to U3 to radiator R1. In a short period of time this reassignment may be accomplished and is illustrated as the transmission to U3 from radiator R1 at 935.

Figure 10:
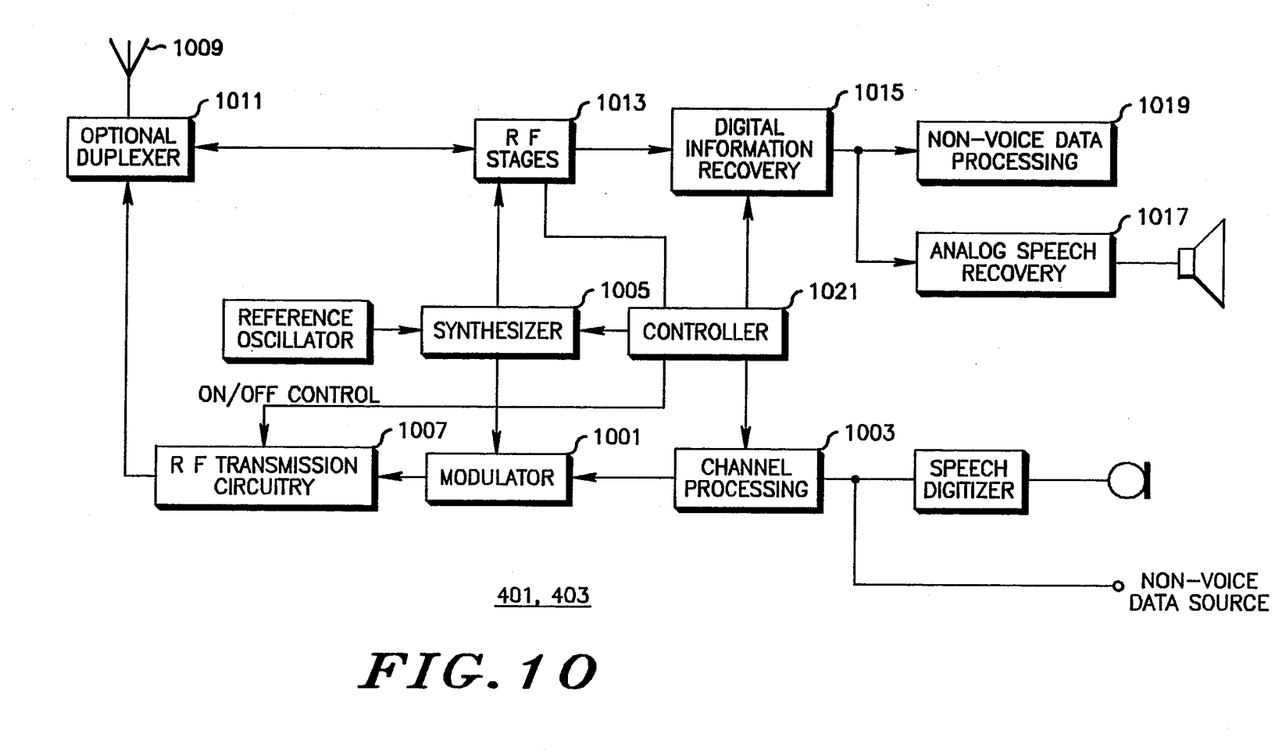
FIG. 10 is a block diagram of a remote unit which may be employed in the present invention.

A typical remote unit (401, 403) which may be employed in the radio frequency implementation of the system of the present invention is shown in FIG. 10. A transmitter portion accepts voice or non-voice data inputs to a modulator 1001 via digital channel processing circuitry 1003 and applies a modulated radio frequency (RF) signal (generated by a synthesizer 1005) to RF transmission circuitry 1007 to an RF antenna 1009 through an optional duplexer 1011. Signals received by the antenna 1009 are coupled by the optional duplexer 1011 to the RF stages of a receiver 1013 to conventional digital information recovery circuitry 1015 for reconversion to analog audio signals (by analog speech recovery network 1017) or presentation to a data processing sink 1019. A microprocessor based controller system 1021 may be employed to accept quality measurements from the RF stages 1013 to select operating channels via the synthesizer 1005 and to control the processing of the digital information by the transmitter via channel processing circuitry 1003 and the digital information recovery circuitry 1015.

Figures 11, 12:
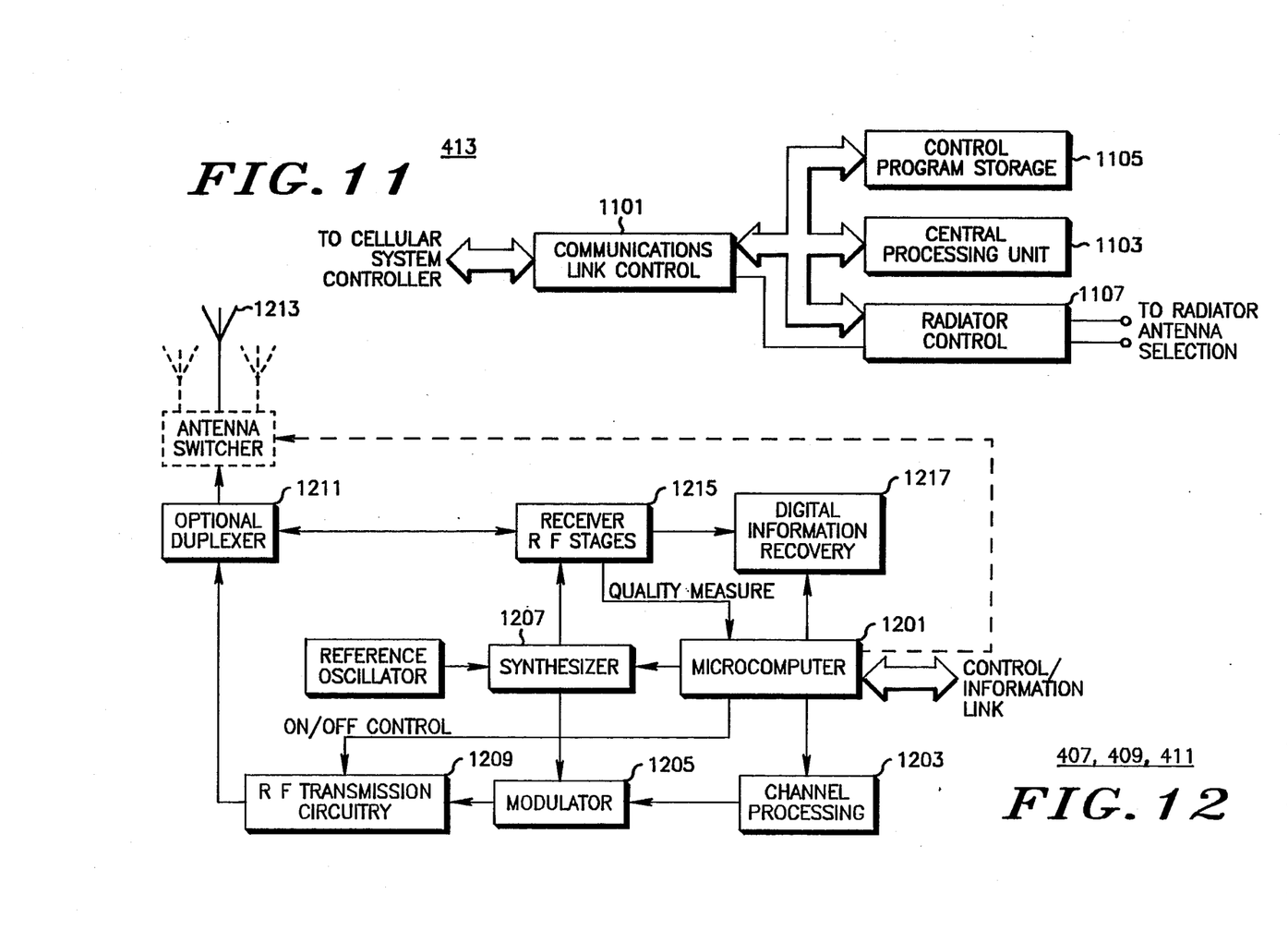
FIG. 11 is a block diagram of a cell area controller which may be employed in the present invention.
FIG. 12 is a block diagram of a fixed equipment radiator which may be employed in the present invention.

A block diagram of a cell area controller is shown in FIG. 11. System control information is received from a cellular switch and system controller 503 and control-/information is transferred back to the cellular switch and system controller 503 via a communications link control circuit 1101, which performs the generalized functions of a modem. Coupled to the communications link control 1101 via the cell area controller bus is the central processing unit 1103 which may be a conventional microprocessor (such as an MC68HC11 microprocessor) and associated hardware. Control program storage and active memory is available to the central processing unit 1103 from conventional RAM and ROM, shown as control program storage 1105. The radiators or their antennas are selected by radiator control circuitry 1107 which may be a conventional peripheral interface adaptor.

A radio transceiver which may be employed as a radiator (such as 407, 409, and 411) is shown in block diagram form in FIG. 12. Here, information which is to be transmitted and transceiver control information from the cell area controller is input to a local microcomputer 1201 (which may be a conventional microprocessor such as a MC68HC11 or equivalent). The information to be transmitted, which is in digital form, is coupled to channel processing circuitry 1203 which frames, buffers, and codes the information. The processed information is then passed to a radio frequency signal modulator 1205 where a radio frequency generated by synthesizer 1207 is modulated with the processed information. The modulated radio frequency signal is then coupled to radio frequency transmission circuitry 1209 for filtering and amplification before passing to an optional duplexer 1211 for radiation by antenna 1213. Signals received by antenna 1213 are coupled to the receiver RF stages 1215 via optional duplexer 1211. The received signal, after filtering and demodulation, is passed to digital information recovery circuitry 1217 where the information is removed from the transmission frames, synchronized, and error corrected. The received information is then coupled to the microcomputer system 1201 for conveyance to the cell area controller. An additional quality measure output is obtained by receiver RF stages 1215 and coupled to the microcomputer 1201 for ultimate use by the cell area controller in channel selection.

Figure 13:
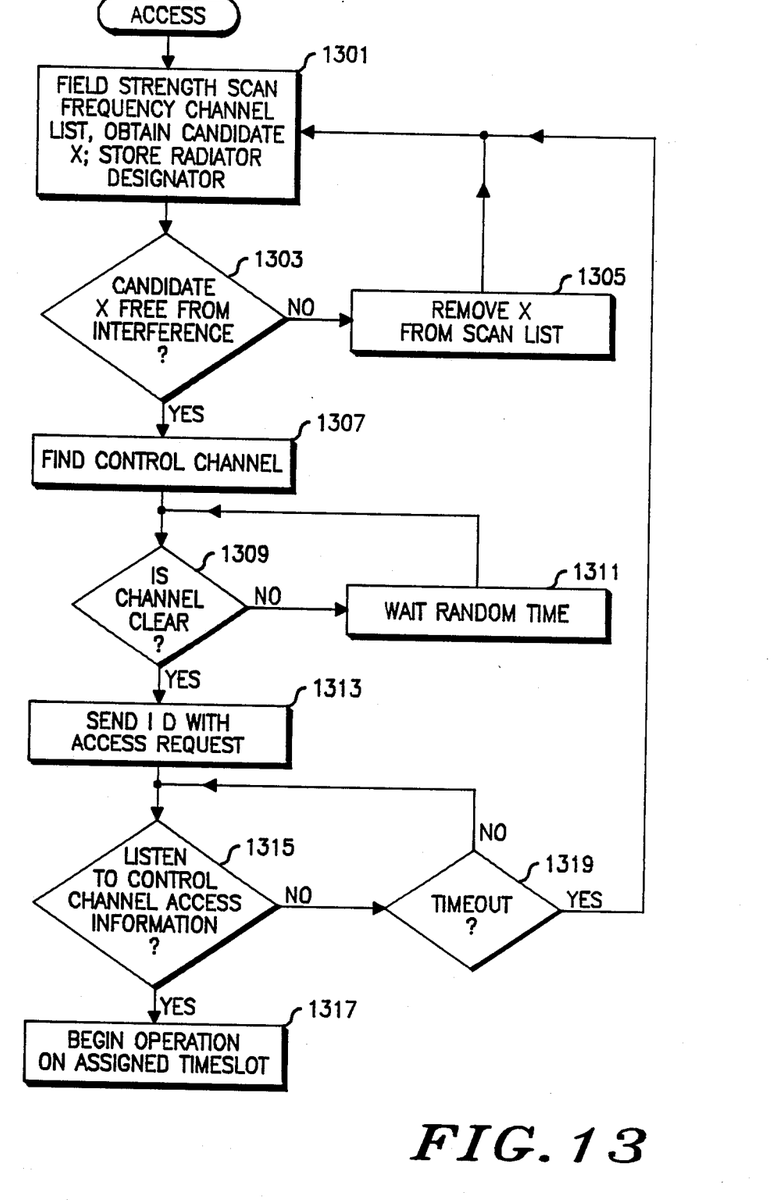
FIG. 13 is a flowchart of the channel access process employed by a remote unit of the present invention.

Remote unit access is controlled by the process illustrated in the flowchart of FIG. 13. This process is executed by the controller 1021 of a remote unit. Upon entering this process, the remote unit controller causes the synthesizer 1005 to scan a previously determined list of channel frequencies to determine the signal quality of each of the channels. In the preferred embodiment, this quality measurement is a determination of field signal strength. For a particular channel "X" a radiator designator is stored in the controller memory at 1301. A determination of the candidate "X" freedom from interference is made at 1303 and the candidate "X" is removed from the frequency channel scanning list at 1305 if the channel is not free from interference. If it is free from interference, the control channel time slot is determined at 1307 and a determination of whether a control channel time slot is available is made at 1309. If a free control channel time slot is not immediately available, the process waits a predetermined random time at 1311 before again checking for a free control channel time slot. If a control channel time slot is clear, the remote unit transmits its identification with a request for access at 1313. When the access is confirmed on the control channel, as determined at 1315, message transmission may begin on the assigned time slot at 1317. If access is not confirmed within a predetermined period of time as determined at 1319, the remote unit process returns to the channel list scanning operation shown in block 1301.

Figure 14:
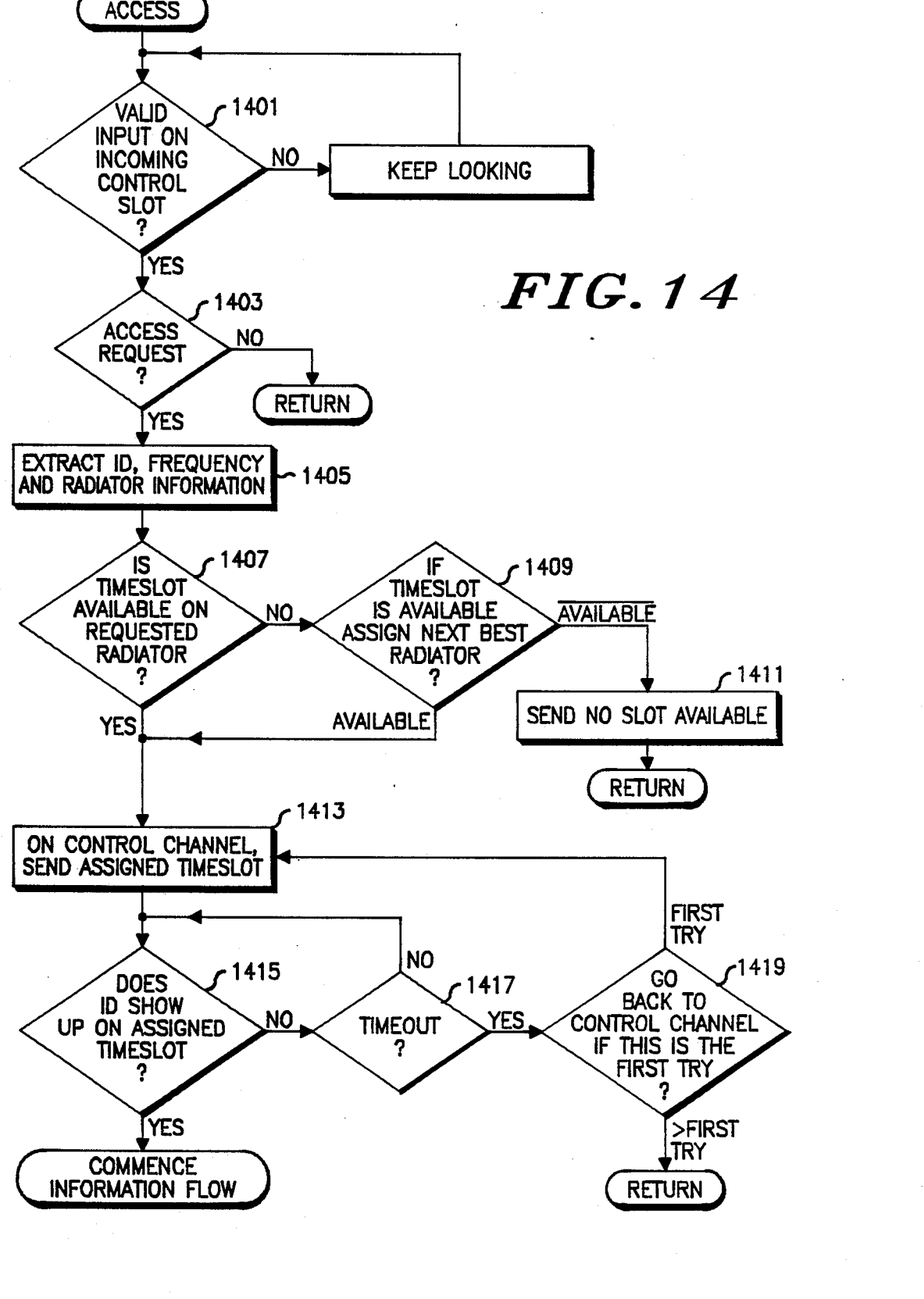
FIG. 14 is a flowchart of the channel access process employed by a cell area controller of the present invention.

The process employed by the cell area controller, as exercised by the central processing unit 1103, to enable access by a remote unit is shown in FIG. 14. A determination is made, at 1401, whether the data received on the incoming control slot constitutes a valid input. If the input data is valid a determination is made, at 1403, whether the input is a request for access. If the data is not a request for access, the process continues with other tasks. But if the data is a request for access, the remote unit identification, frequency, and radiator information is extracted at 1405. A determination is then made (at 1407) whether there is a time slot available from the radiator requested by the remote unit. If such a time slot is not available, a determination is made if a time slot is available on the next best radiator identified by the remote unit (at 1409). If no time slot is available via any of the radiators selected by the remote unit, a no time slot available message is transmitted to the remote unit at 1411 and the cell area controller returns to other tasks. If, however, the requested radiator has a time slot available as determined at 1407 or if the next best radiator has a time slot available as determined at 1409, the process causes the fixed site radiator to transmit the assigned time slot designation on the control channel (at 1413). When the remote unit identification is detected in the assigned time slot (at 1415), transmission of information data commences on the assigned time slot. If the remote unit identification does not appear within a predetermined time, as determined at 1417 the process tries again to send the assigned time slot information on the control channel to the remote unit (at 1419). If, in the preferred embodiment, more than two tries to assign the remote unit have been made, the process returns to other tasks.

Figure 15:
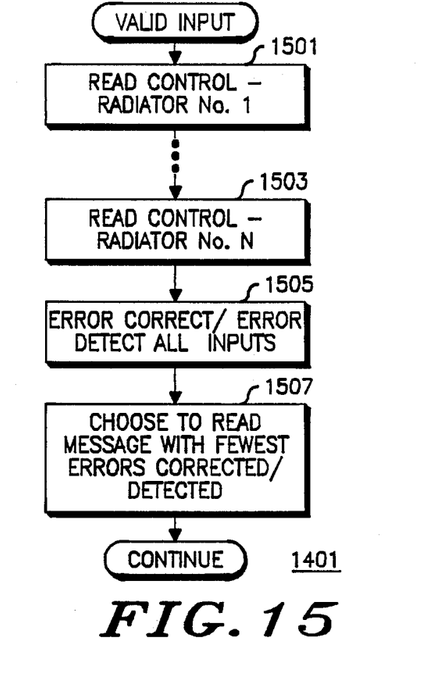
FIG. 15 is a flowchart of the valid input determination process of FIG. 14.

The valid input determining step 1401 is shown in greater detail in FIG. 15. The signal quality is read from the control channel of each radiator reporting to the cell area controller (at 1501 and 1503). Each of the inputs received from the control channels from each radiator is error detected and corrected at 1505 and the message with the fewest errors detected or corrected is the message chosen to be the most accurate representation of a transmission on the control slot of the radio channels received by the radiators. Use of the valid input measurement technique prevents corruption of a valid message by improperly received signals.

Figure 16:
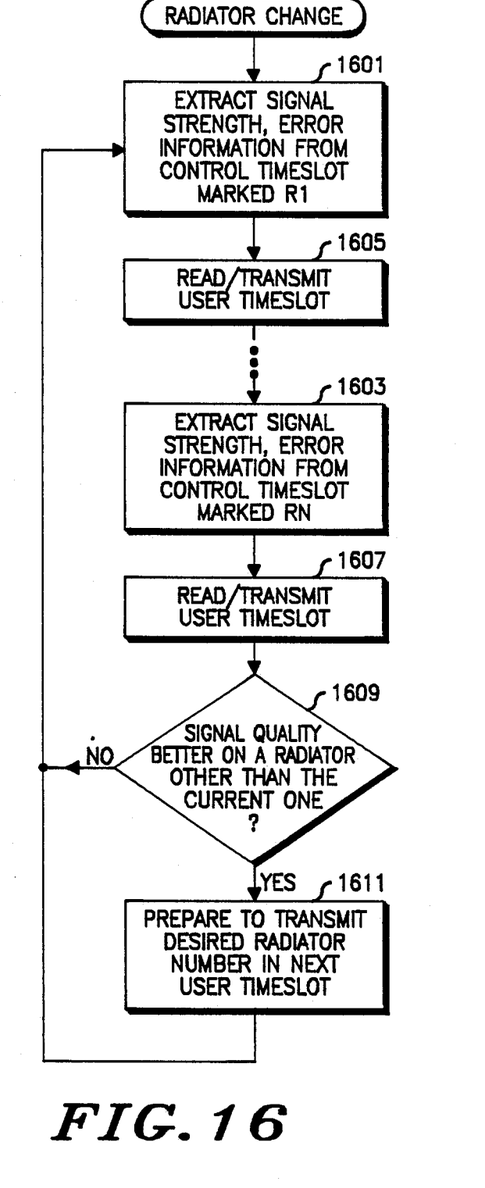
FIG. 16 is a flowchart of the radiator change process employed by a remote unit of the present invention.
Figure 17:
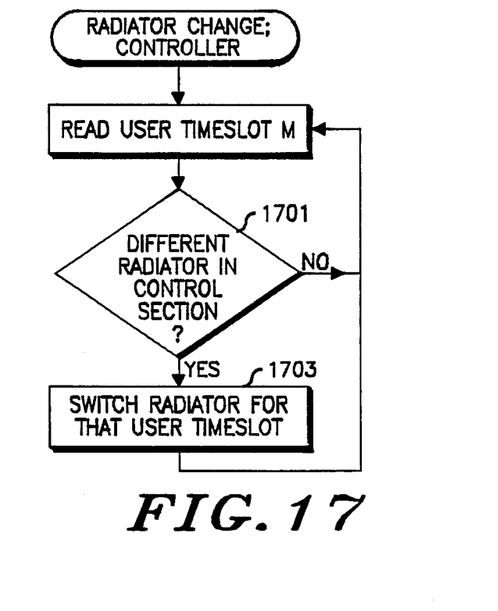
FIG. 17 is a flowchart of the radiator change process employed by a cell area controller of the present invention.

The process employed by the controller 1021 of a remote unit to determine the need to change radiators is shown in FIG. 16. The remote unit process extracts the signal strength and error information from the time slots reserved in the outbound message for transmission of control information from each of the radiators R1 through RN, as shown at 1601 and 1603. Interspersed between the measurements of the radiator control time slot is the reading and transmission of the time slot assigned to the remote unit, shown at 1605 and 1607. At the conclusion of the cycle of time slots containing all of the control slot transmissions during that cycle, the quality of signal received from each radiator is compared to the quality of signal from the radiator currently being used (at 1609). If the signal quality is better from a different radiator, the better radiator number is transmitted in the next user time slot at 1611. The cell area controller receives the desired radiator number in the user time slot as shown in FIG. 17. If the cell area controller detects the different radiator number in the user time slot control section (at 1701), the radiator used to transmit that user data in that time slot is switched to the radiator requested by the remote unit at 1703.

In summary, then, cellular system utilizing time division multiplexing of messages to and from remote units has been shown and described. Multiple fixed site signal radiators may be employed to radiate signals to and receive signals from remote units but each particular remote unit transmits to and receives from only a selected one of the fixed site radiators during an assigned time slot. If the signal received by the remote unit from the selected radiator is not as good as that which could be received from a second radiator, the remote unit selects the second radiator and commands the fixed site radiators to use the second radiator to transmit the assigned time slot to the remote unit. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

I claim:

1. A communications system having a plurality of electromagnetic coverage areas created by electromagnetic radiators each radiator controlled by an area controller and serving a plurality of remote stations within each coverage area, comprising:

a first radiator transmitting a first electromagnetic signal during at least a first one of a plurality of time slots on a first electromagnetic frequency into at least a first portion of the electromagnetic coverage area;

a second radiator transmitting a second electromagnetic signal during at least a second one of said plurality of time slots on said first electromagnetic frequency into at least a first portion of the electromagnetic coverage area;

means at a remote station for selecting between said first and second electromagnetic signals and communicating said selection to the area controller; and means at the area controller for selecting, in response to said communication of said selection between said first and second electromagnetic signals, a third one of said plurality of time slots on said first electromagnetic frequency for transmission of at least a portion of a first message to said remote station.

2. A communications system in accordance with claim 1 further comprising means, responsive to said remote station electromagnetic signal selection, for enabling during said third time slot the radiator transmitting said selected electromagnetic signal.

3. A communications system in accordance with claim 1 further comprising means at said remote station for transmitting at least a portion of a second message to a receiver means associated with the radiator transmitting said selected electromagnetic signal, said at least a portion of said second message transmitted in a time slot on a second electromagnetic frequency associated with said third time slot on said first electromagnetic frequency.

4. A communications system in accordance with claim 3 further comprising means at the area controller for measuring signal quality received in said time slot on said second electromagnetic frequency.

5. A communications system in accordance with claim 4 further comprising means at the area controller for determining that said measured signal quality indicates that said remote station should be handed off to another area controller in another electromagnetic coverage area.

6. A communications system in accordance with claim 1 further comprising means for cyclically repeating said plurality of time slots including said first, second, and third time slots.

7. A communications system in accordance with claim 6 wherein said means at a remote station for selecting further comprises means for determining signal quality of said first and second electromagnetic signals.

8. A communications system in accordance with claim 7 wherein said means at a remote station for selecting further comprises:

means for determining, after transmission during said third time slot, that said electromagnetic signal not selected has a better signal quality than said selected electromagnetic signal;

means for newly selecting said electromagnetic signal previously not selected; and means for communicating said new selection to the area controller.

9. A communications system in accordance with claim 8 further comprising:

means at the area controller for enabling the radiator of said newly selected electromagnetic signal for transmitting at least a portion of said first message to said remote station in said third time slot; and means for disabling during said third time slot the radiator of electromagnetic signals not newly selected.

10. A remote station for a communications system having a plurality of electromagentic coverage areas with fixed electromagnetic transceivers controlled by an area controller in each coverage area, comprising:

means for receiving a first electromagnetic signal from a first transceiver during a first one of a plurality of time slots on a first electromagnetic frequency and for receiving a second electromagnetic signal from a second transceiver during a second one of said plurality of time slots on said first electromagnetic frequency;

means for selecting between said first and second electromagnetic signals;

means for communicating said selection to the area controller; and means for receiving from the area controller said selected electromagnetic signal which conveys at least a portion of a message to the remote station during a third one of said plurality of time slots, said third one of said plurality of time slots selected by the area controller.

11. A remote station in accordance with claim 10 further comprising means for transmitting at least a portion of a second message on a second electromagnetic frequency to the transceiver transmitting said selected electromagnetic signal in a time slot associated with said selected third time slot.

12. A remote station in accordance with claim 10 wherein said means for selecting further comprises means for determining signal quality of said first and second electromagnetic signals.

13. A remote station in accordance with claim 12 wherein said means for selecting further comprises:

means for determining, after transmission of said selected third time slot, that said electromagnetic signal not selected has a better signal quality than said selected electromagnetic signal;

means for newly selecting said electromagnetic signal previously not selected; and means for communicating said new selection to the area controller.

14. Fixed site control and transceiving apparatus for a communications system having a plurality of electromagnetic coverage areas serving a plurality of remote stations having transceivers within each coverage area, comprising:

means for transmitting a first electromagnetic signal during at least a first one of a plurality of time slots on a first electromagnetic frequency into at least a first portion of the electromagnetic coverage area;

means for transmitting a second electromagnetic signal during at least a second one of said plurality of time slots on said first electromagnetic frequency into at least a second portion of the electromagnetic coverage area;

means for receiving a transmission from a remote station which identifies a selected one of said first and second electromagnetic signals; and means, responsive to said means for receiving, for selecting a third one of said plurality of time slots on said first electromagnetic frequency for transmission of at least a portion of a first message to said remote station by said selected one of said first and second electromagnetic signals.

15. Fixed site control and transceiving apparatus in accordance with claim 14 further comprising means for measuring signal quality of at least a portion of a second message received from said remote station in a time slot on a second electromagnetic frequency.

16. Fixed site control and transceiving apparatus in accordance with claim 15 further comprising means for determining that said measured signal quality indicates that said remote station should be handed off to another fixed site control and transceiving apparatus in another electromagnetic coverage area.

17. A method of communications channel selection in a communications system havng a plurality of electromagnetic coverage areas created by electromagnetic radiators each radiator controlled by an area controller and transmitting to a plurality of remote stations within each coverage area, comprisng the steps of:
   transmitting a first electromagnetic signal during at least a first one of a plurality of time slots on a first electromagnetic frequency into at least a first portion of the electromagnetic coverage area;
   transmitting a second electromagnetic signal during at least a second one of said plurality of time slots on said first electromagnetic frequency into at least a second portion of the electromagnetic coverage area;
   selecting, at a remote station, between said first and second electromagnetic signals;
   communicating said selection to the area controller; and
   selecting, at the area controller, a third one of said plurality of time slots on said first electromagnetic frequency in response to said communicating said selection between said first and second electromagnetic signals for transmission of at least a portion of a first message to said remote station.

18. A method of communications channel selection in accordance with the method of claim 17 further comprising the step of enabling during said third time slot the radiator which transmitted said selected electromagnetic signal, in response to said remote station selection.

19. A method of communications channel selection in accordance with the method of claim 18 further comprising the step of transmitting, at said remote station, at least a portion of a second message in a time slot on a second electromagnetic frequency associated with said third time slot on said first electromagnetic frequency.

20. A method in accordance with the method of claim 19 further comprising the step of measuring signal quality received in said time slot on said second electromagnetic frequency.

21. A method in accordance with the method of claim 20 further comprising the step of determining, at the area controller, that said measured signal quality indicates that said remote station should be handed off to another area controller in another electromagnetic coverage area.

22. A method of communications channel selection in accordance with the method of claim 18 further comprising the step of cyclically repeating at least said first, second, and third time slots.

23. A method of communications channel selection in accordance with claim 22 wherein said step of selecting, at a remote station, further comprises the step of determining signal quality of said first and second electromagnetic signals.

24. A method of communications channel selection in accordance with claim 23 wherein said step of selecting, at a remote station, further comprises the steps of:
   determining, after transmission during said third time slot, that said electromagnetic signal not selected has a better signal quality than said selected electromagnetic signal;
   newly selecting said electromagnetic signal previously not selected; and
   communicating said new selection to the area controller.

25. A method of communications channel selection in accordance with the method of claim 24 further comprising the steps of:
   enabling, at the area controller, the radiator of said newly selected electromagnetic signal for transmitting at least a portion of said first message to said remote station in said third time slot; and
   disabling that radiator of electromagnetic signals not newly selected during said third time slot.

26. A method of communications channel selection in a remote station for a communications system having a plurality of electromagentic coverage areas with fixed electromagnetic transceivers controlled by an area controller in each coverage area, comprising the steps of:
   receiving a first electromagnetic signal from a first transceiver during a first one of a plurality of time slots on a first electromagnetic frequency;
   receiving a second electromagnetic signal from a second transceiver during a second one of said plurality of time slots on said first electromagnetic frequency;
   selecting between said first and second electromagnetic signals;
   communicating said selection to the area controller; and
   receiving from the area controller said selected electromagnetic signal which conveys at least a portion of a first message to the remote station during a third one of said plurality of time slots, said third one of said plurality of time slots selected by the area controller.

27. A method of communications channel selection in accordance with the method of claim 26 further comprising the step of transmitting at least a portion of a second message on a second electromagnetic frequency to the transceiver transmitting said selected electromagnetic signal in a time slot associated with said selected third time slot.

28. A method in accordance with the method of claim 27 further comprising the step of measuring signal quality received in said time slot on said second electromagnetic frequency.

29. A method in accordance with the method of claim 28 further comprising the step of determining, at the area controller, that said measured signal quality indicates that said remote station should be handed off to another area controller in another electromagnetic coverage area.

30. A method of communications channel selection in accordance with the method of claim 26 wherein said step of selecting further comprises the step of determining signal quality of said first and second electromagnetic signals.

31. A method of communications channel selection in accordance with the method of claim 30 wherein said step of selecting further comprises the steps of:
determining, after reception of said at least a portion of a first message during said third time slot, that said electromagnetic signal not selected has a better signal quality than said selected electromagnetic signal;
newly selecting said electromagnetic signal previously not selected; and
communicating said new selection to the area controller.

32. A method of communications channel selection for fixed site control and transceiving apparatus for a communications system having a plurality of electromagnetic coverage areas serving a plurality of remote stations having transceivers within each coverage area, comprising the steps of:
transmitting a first electromagnetic signal during at least a first one of a plurality of time slots on a first electromagnetic frequency into at least a first portion of the electromagnetic coverage area;
transmitting a second electromagnetic signal during at least a second one of said plurality of time slots on said first electromagnetic frequency into at least a second portion of the electromagnetic coverage area;
receiving a transmission from a remote station which identifies a selected one of said first and second electromagnetic signals; and
selecting, in response to said receiving step, a third one of said plurality of time slots on said first electromagnetic frequency for transmission of at least a portion of a first message to said remote station by said selected one of said first and second electromagnetic signals.

33. A method in accordance with the method of claim 32 further comprising the step of measuring signal quality of at least a portion of a second message received from said remote unit in a time slot on a second electromagnetic frequency.

34. A method in accordance with the method of claim 33 further comprising the step of determining that said measured signal quality indicates that said remote station should be handed off to another fixed site control and transceiving apparatus in another electromagnetic coverage area.

35. A cellular telephone system having a plurality of electromagnetic coverage areas created by electromagnetic radiators each radiator controlled by an area controller and serving a plurality of remote stations within each coverage area, comprising:
a first radiator transmitting a first electromagnetic signal during at least a first one of a plurality of time slots on a first electromagnetic frequency into at least a first portion of the electromagnetic coverage area;
a second radiator transmitting a second electromagnetic signal during at least a second one of said plurality of time slots on said first electromagnetic frequency into at least a second portion of the electromagnetic coverage area;
means at a remote station for selecting between said first and second electromagnetic signals based on electromagnetic signal quality to establish a selected signal and an unselected signal, and communicating said selection to the area controller;
means at the area controller for selecting, in response to said remote station selection, a third one of said plurality of time slots on said first electromagnetic frequency for transmission of at least a portion of a first message to said remote station during said third time slot;
means for determining, after transmission during said third time slot, that said unselected signal has a better signal quality than said selected signal;
means for newly selecting said unselected signal and for communicating said new selection to the area controller; and
means at the area controller, responsive to said communication of said new selection, for enabling the radiator of said newly selected unselected signal for transmitting at least a portion of said first message to said remote station in said third one of said plurality of time slots on said first electromagnetic frequency.

36. A cellular telephone system in accordance with claim 35 further comprising means, responsive to said communication of said new selection, for disabling during said third time slot the radiator of said selected signal.

37. A cellular telephone system in accordance with claim 35 further comprising means at said remote station for transmitting at least a portion of a second message to the radiator associated with said selected signal, said at least a portion of a second message transmitted in a time slot on a second electromagnetic frequency associated with said third one of a plurality of time slots on said first electromagnetic frequency.

38. A remote station for a cellular telephone system having a plurality of electromagnetic coverage areas with fixed electromagnetic transceivers controlled by an area controller in each coverage area, comprising:
means for receiving a first electromagnetic signal from a first transceiver during a first one of a plurality of time slots on a first electromagnetic frequency and for receiving a second electromagnetic signal from a second transceiver during a second one of said plurality of time slots on said first electromagnetic frequency;
means for selecting between said first and second electromagnetic signals based on electromagnetic signal quality;
means for communicating said selection to the area controller;
means for receiving from the area controller said selected electromagnetic signal which conveys at least a portion of a message to the remote station during a thrd one of said plurality of time slots;
means for transmitting at least a portion of a second message on a second electromagnetic frequency to the transceiver transmitting said selected electromagnetic signal in a fourth time slot associated with said selected third time slot;
means for determining, after transmission during said selected third time slot, that said electromagnetic signal not selected has a better signal quality than said selected electromagnetic signal;
means for newly selecting said electromagnetic signal previously not selected; and
means for communicating said new selection to the area controller.

39. A cellular communications system having a plurality of coverage areas each illuminated from an electromagnetic energy radiator, each radiator controlled by an area controller and serving a plurality of remote stations within each coverage area, the system comprising:
- means, at a first radiator, for transmitting at least a first information signal during a first one of a plurality of time slots on a first electromagnetic frequency into at least a first portion of the electromagnetic coverage area;
- means, at a second radiator, for transmitting at least a second information signal during a second one of said plurality of time slots on said first electromagnetic frequency into at least a second portion of the electromagnetic coverage area;
- means at a remote station for selecting between said first and second signals and communicating said selection to the area controller; and
- means at the area controller for selecting, in response to said communication of said selection between said first and second signals, a third one of said plurality of time slots on said first electromagnetic frequency for transmission of a message comprising control and message information data bits to said remote station.

* * * * *

UNITED STATES PATENT AND TRADEMARK OFFICE
CERTIFICATE OF CORRECTION

PATENT NO. : 4,797,947
DATED : Jan. 10, 1989
INVENTOR(S) : Gerald P. Labedz

It is certified that error appears in the above-identified patent and that said Letters Patent is hereby corrected as shown below:

Col. 11, line 12, "first" should be --second--

Col. 16, line 55, "thrd" should be --third--

Signed and Sealed this

Seventeenth Day of April, 1990

Attest:

HARRY F. MANBECK, JR.

*Attesting Officer*     *Commissioner of Patents and Trademarks*